H. L. PARKER & A. E. COBB.
COMBINED REGULATING AND SHUT-OFF FAUCET.
APPLICATION FILED APR. 26, 1915.
1,257,019.
Patented Feb. 19, 1918.
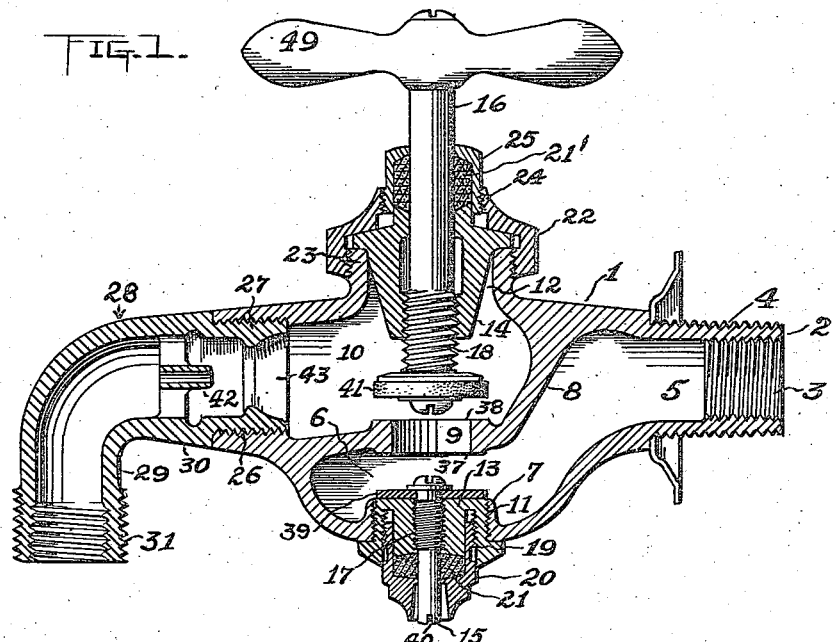
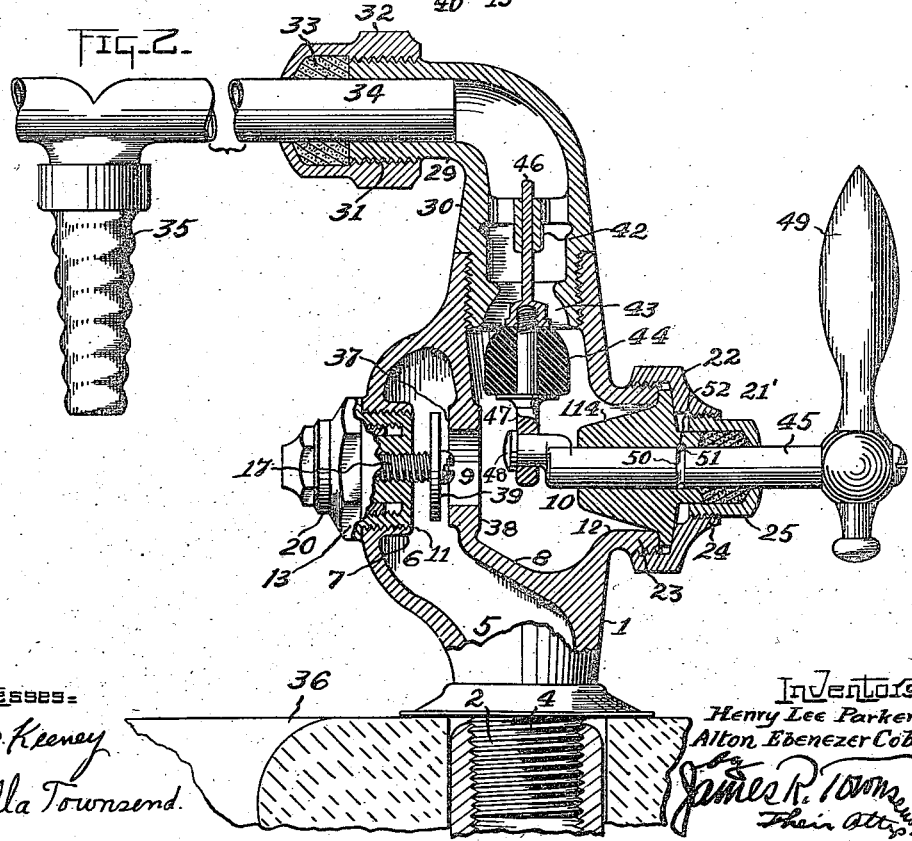
Witnesses:
F. M. Keeney
Estella Townsend.
Inventors:
Henry Lee Parker.
Alton Ebenezer Cobb.

UNITED STATES PATENT OFFICE.

HENRY LEE PARKER AND ALTON EBENEZER COBB, OF LOS ANGELES, CALIFORNIA.

COMBINED REGULATING AND SHUT-OFF FAUCET.

1,257,019. Specification of Letters Patent. Patented Feb. 19, 1918.

Application filed April 26, 1915. Serial No. 24,106.

*To all whom it may concern:*

Be it known that we, HENRY LEE PARKER and ALTON EBENEZER COBB, citizens of the United States, residing at Los Angeles, in the county of Los Angeles and State of California, have invented a new and useful Combined Regulating and Shut-Off Faucet, of which the following is a specification.
An object of the invention is to provide a faucet which is applicable for long and short connections and is adapted to be used as a wash-stand faucet, a hose bib, a shampoo wash-stand connection or a connection for use in laboratory work, and which can be regulated to limit the volume of liquid that will flow therethrough when the faucet is fully open.

An object is to provide a faucet in which the service valve can be cut off from the service, so that said service valve may be removed, repaired and replaced without cutting off the water supply at the street valve; also to provide for easy and cheap repair.
An object of the invention is to so construct a faucet that the same body and nozzle can be used with a Fuller ball valve or compression valve as occasion may require.

Another object is to make provision whereby a swivel hose attachment can be conviently applied to the faucet.

Another object is to provide for conveniently molding the faucet body.

Other objects and advantages may appear from the subjoined detail description.

The invention is capable of being carried out in various ways.

The accompanying drawings illustrate the invention in the form at present deemed most desirable.

Figure 1 is an axial section of a faucet constructed in accordance with this invention ready for application as a hose-bib, either with a long or with a short connection. A compression valve is shown partly closed and the regulating valve is shown fully open.

Fig. 2 is an elevation partly in section of a faucet having a body identical to that shown in Fig. 1, the same being supplied with a Fuller ball valve and being mounted on a wash-stand, and connected with a swivel connection adapted to receive a hose for shampoo purposes. The Fuller ball valve is shown partly open and the regulating and cut-off valve is shown partly closed.

The faucet body 1 may be of any usual material such as brass, composition metal, galvanized cast-iron, etc., and is provided at its inlet end with the attaching portion 2 having internal and external threads 3, 4. The inlet 5 may be circular or of any desired shape in cross-section and leads to the valve chamber 6 surrounding an internally-threaded barrel 7, forming an orifice for mounting a valve stem and valve in said valve chamber. An internal web 8 having a port 9 therethrough divides the interior of the faucet into the two valve chambers 6 and 10, which chambers are provided with orifices 11, 12 to receive the valve stem bushings 13, 14 respectively that are suitably mounted in said orifices 11, 12, to carry valve stems 15, 16, that are arranged co-axially with, and on opposite sides of, the port 9, and are provided with threaded portions 17, 18, screwed into the bushings which are threaded as nuts. The bushing nut 13 is shown provided with an annular channel 19 to receive the annular gland 20 to hold suitable packing 21 in place. The bushing 14 is of a different type, being held in place by a bonnet nut 22 screwed onto the threaded boss 23 externally surrounding the orifice 12 and projecting from the body 1 of the faucet. Said bonnet nut 22 is provided with a screw-threaded portion 24 to receive a gland 25 compressing the packing 21' around the valve stem 16. The second valve chamber 10 communicates with an outlet 26 that is internally threaded to receive the reduced end 27 of a detachable bib nozzle 28 that may be externally and internally threaded as shown in Fig. 1, for connection to a hose coupling or nipple, or may be threaded either internally or externally only; the latter form being shown in Fig. 2. Said bib nozzle 28 is preferably provided with an unthreaded neck 29 between the main body 30 and an enlarged threaded tip portion 31 of the nozzle. Upon said threaded portion 31, a gland 32 may be screwed to compress packing 33 around a tube 34, which is of like straight cylindrical form at both ends and comprises two limbs united centrally at a common nipple 35 to receive a hose, not shown, and being rotatable at the joints thus formed. When the cylindrical ends of the fixture as at 34 are connected with the hot and cold water faucets of a wash-stand 36, the installation is complete for furnishing to the central nipple 35 and the hose, not shown, hot, cold and variously tempered water.

The port 9 is provided with two flat valve seats 37, 38. In order that the flow of water can be regulated, a flat-faced compression valve 39 is provided in the first valve chamber 6 on the end of the valve stem 15 to close against the valve seat 37 on the inlet side of the port 9. Said valve stem 15 is provided with a slot 40 to admit a screw-driver, not shown, to adjust the valve 39 to any position in the valve chamber 6 desired to determine the exact amount of water that can flow through the faucet when the flat-faced compression valve 41 is fully open.

The bib nozzle is provided with a guide 42 and a valve seat 43; and in Fig. 2 a Fuller ball valve 44 is mounted on a Fuller valve stem 45 and is provided with a guide-rod 46, the same being mounted in place as shown to control the flow of liquid through the valve chamber 10. Said valve chamber is thus provided with two valve seats, the produced axes of which intersect at right angles, so that the one fitting is adapted for installation alternatively with a compression valve or a Fuller valve.

The connection 47 between the Fuller ball valve 44 and crank 48 may be of any common well-known construction.

The valve stem 45 is provided with an annular groove 50 in which a pin 51 is driven through a hole 52 bored through the neck of the bushing 114, thus to hold the stem 45 in true position.

By unscrewing the bib nozzle ready access is gained to the valve ball which can be removed in an obvious way.

By mounting the valve stems in the detachable bushings 13, 14 the life of the faucet body is prolonged indefinitely, since the wear and tear on the threads caused by opening and closing the faucet does not affect the body of the faucet, and when the valve 41 and the threads on the valve stem 16 of the compression valve become worn it is simply necessary to close the valve 39 and then unscrew the bonnet 22, detach the faucet handle 49 from the valve stem, withdraw the valve stem 16 from the bonnet and gland, and discard the bushing valve and valve stem instead of throwing away the faucet body.

We claim:—

A faucet provided with two valve chambers; a port between and in communication with said valve chambers; said port having a flat seat at its inlet and a flat seat at its outlet; a flat-faced compression valve adapted to be adjusted to control the inlet to said port; a bib nozzle detachably connected to the outlet of the faucet; said detachable nozzle having concentrically therein guiding means for a Fuller ball valve stem and at its attached end a valve seat for said ball valve; said faucet thereby being adapted for use alternatively in connection with a flat-faced compression valve for opening and closing the outlet of said port or a Fuller ball valve adapted to open and close upon the valve seat in the nozzle, to control the flow of liquid through said faucet.

In testimony whereof we have hereunto set our hands at Los Angeles, California, this 20th day of April, 1915.

HENRY LEE PARKER.
ALTON EBENEZER COBB.

In presence of—
JAMES R. TOWNSEND,
ESTELLA TOWNSEND.